Sept. 9, 1952　　　O. B. SURBER　　　2,610,002
FISHING REEL

Filed Aug. 1, 1946　　　　　　　　3 Sheets-Sheet 1

INVENTOR.
OTIS B. SURBER,
BY *Victor J. Evans & Co.*
ATTORNEYS

Sept. 9, 1952 O. B. SURBER 2,610,002
FISHING REEL
Filed Aug. 1, 1946 3 Sheets-Sheet 2
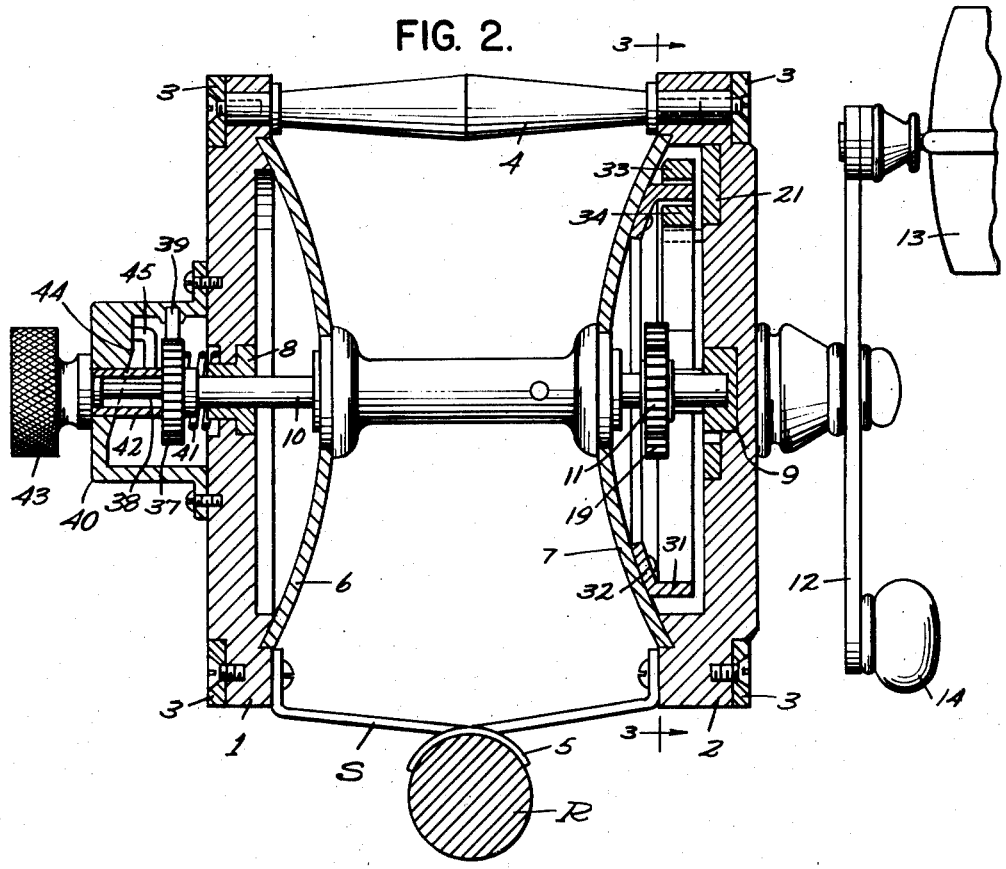
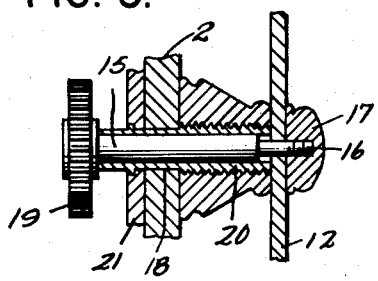
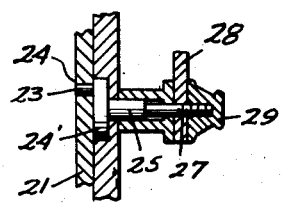
INVENTOR.
OTIS B. SURBER,
BY *Victor J. Evans & Co.*
ATTORNEYS Sept. 9, 1952   O. B. SURBER   2,610,002
FISHING REEL
Filed Aug. 1, 1946   3 Sheets-Sheet 3

INVENTOR.
OTIS B. SURBER,
BY *Victor J. Evans & Co.*
ATTORNEYS

Patented Sept. 9, 1952

2,610,002

UNITED STATES PATENT OFFICE 2,610,002

FISHING REEL

Otis B. Surber, Los Angeles, Calif.

Application August 1, 1946, Serial No. 687,565

4 Claims. (Cl. 242—84.6)

My present invention relates generally to improvements in fishing reels and more particularly to improvements in the mechanical construction and arrangement of parts for operating the reel as well as for controlling the operation of the reel, and in the construction and operation of the clicker or signaling device for the reel which is clearly disclosed in my Patent No. 2,570,884, for Click Attachment for Fishing Reels which was issued October 9, 1951.

The primary object of the invention is the provision of a structure of this type, which, due to its simplicity in construction and operation, may properly be operated and controlled by the average fisherman without fumbling, and with necessity for only a minimum attention on the part of the fisherman, thus enabling him to devote the required attention to the catch.

By the compact combinations and arrangements of parts of the reel structure it may be operated and controlled with facility in landing a catch and without danger of loss due to faulty manipulation or erroneous use of parts of the reel.

The invention consists in certain novel combinations and arrangements involving the crank operating unit for the spool, a cam-actuated unit for controlling the operation of the spool, and the clicking mechanism for control of the line and audible signaling, as will be more fully pointed out and claimed.

In the accompanying drawings I have illustrated one complete example of the physical embodiment of my invention wherein the parts are combined and arranged in accord with one mode so far devised for the practical application of the principles of my invention, but it will be understood that changes and alterations may be made in these exemplifying drawings and mechanical constructions within the scope of the claims without departing from the principles of the invention.

Figure 2 is a longitudinal sectional view through the reel with some parts in elevation.

Figure 4 is an enlarged detail sectional view of the control lever and cam unit for shifting the spool into and out of gear, and for braking the spool.

Figure 5 is an enlarged detail sectional view of the operating unit including the crank arm and connections.

Figure 1:
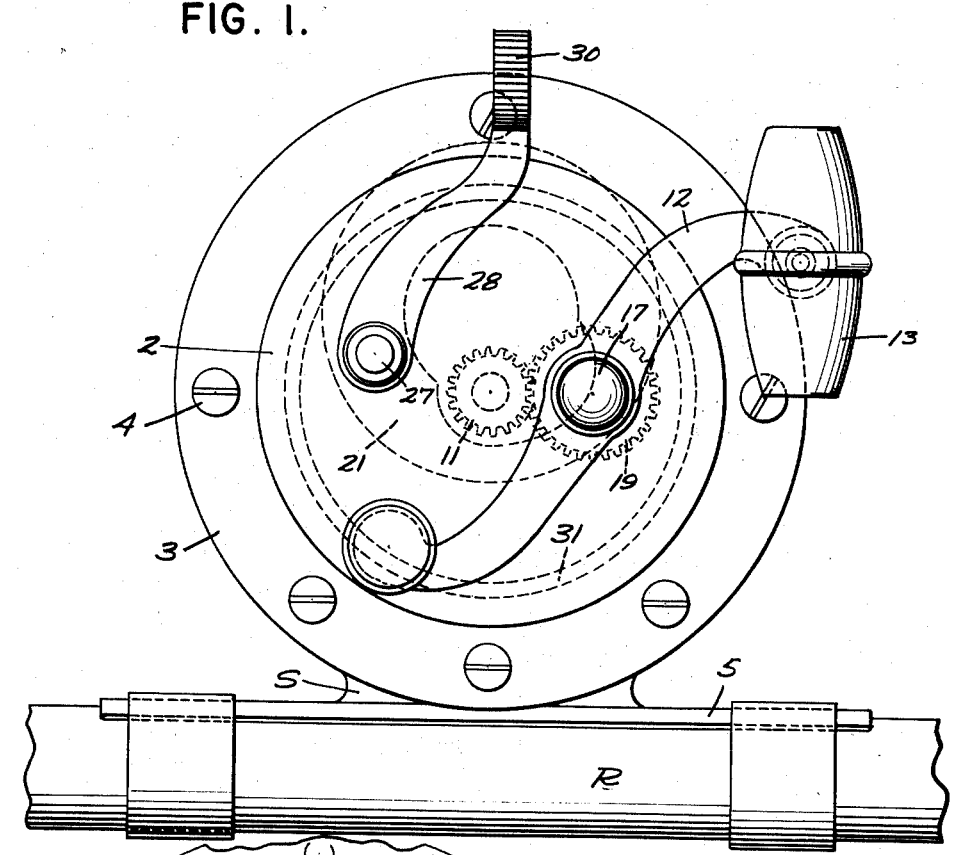
Figure 1 is a view in side elevation of a fishing reel embodying my invention, showing its attachment to a rod, the manually turned crank or operating arm for the spool, the thumb-lever for controlling the spool, and by dotted lines also showing the relation of some of the interior operating parts of the reel.
Figure 7:
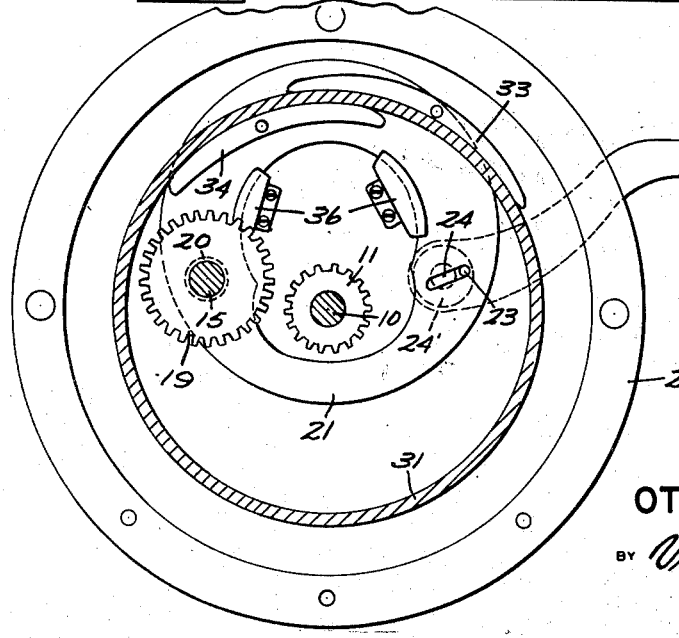
Figure 7 shows the relation of the parts for braking the spool, the double brake shoes being applied to the brake drum.
Figure 3:
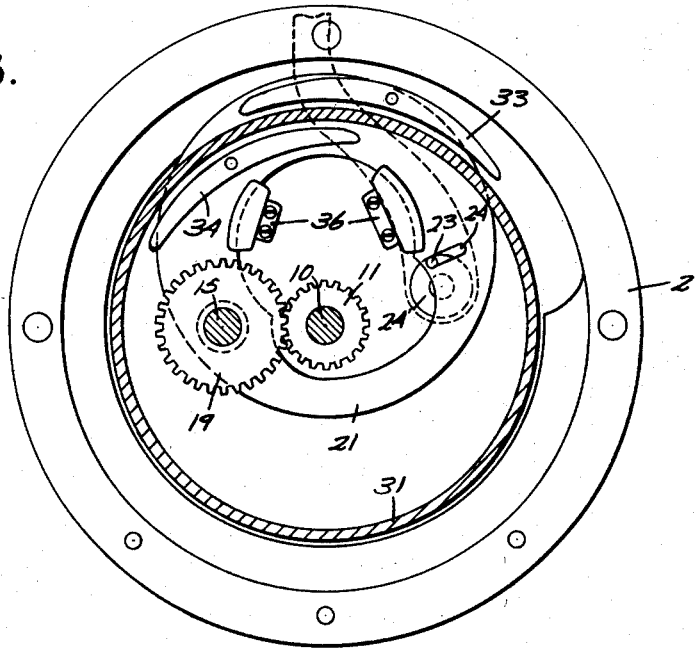
Figure 3 is a transverse sectional view of the reel, as at line 3—3 of Fig. 2.

In carrying out my invention, I employ two spaced circular heads 1 and 2 of molded plastic material, which are reinforced by metallic wear rings 3, 3, inset at the outer faces of the heads and fastened to the heads as by screws. The heads and their wear rings are rigidly united by a series of spaced cross braces or ties 4, 4, and the usual spider S and attaching flange or concavoconvex metal plate 5 is utilized for mounting the reel upon the rod R in the usual manner. The inner faces of the two spaced heads are recessed to accommodate the two flanges 6 and 7 of the spool, and the heads are preferably provided with metallic bushings 8 and 9 that form the bearings for journals of the spool shaft 10 upon which the driven gear 11 is rigidly mounted and located within the open space between the concaved spool head and the head 2.

The driven gear, shaft, and spool are revolved or rotated through the use of the manually operated flat, metallic crank arm 12, located adjacent the reel-head 7 and exterior thereof, and one end of the crank arm is provided with a swiveled hand knob 13 while the other end is provided with counterbalancing weight 14. The crank arm or operating arm is arranged for operation at one side of the reel where it is readily accessible for use when required to operate the spool.

A short drive or stub shaft 15 having a reduced threaded end 16 is mounted rigidly in a central opening of the crank arm, and an exterior nut 17 firmly clamps the arm and the shaft for joint operation. From the exterior crank arm the shaft extends laterally and inwardly through a slot 18 in the head 2 of the reel, and the inner end of the shaft 15 is provided with a driving gear 19 which has a diameter approximately twice that of the driven gear 11 with which it engages for operation of the spool.

The gear couple 11—19 is located in the space between the spool and the head 7 of the reel with the spool shaft and its driven gear 11 centrally located, while the short drive shaft and its driving gear 19 are offset from the center of the spool.

The driving gear 19, with its ratio of two to one meshes with the driven gear 11 for operation of the spool, and it is uncoupled or disengaged from the driven gear to permit free-reeling, and for application of the braking mechanism to the spool.

In order that the drive gear may readily be uncoupled from the driven gear, the manually operated driving unit as a whole is bodily shifted, and to attain this result the drive shaft 15 is journaled to rotate or revolve in a comparatively long cylindrical bearing bushing or sleeve 20 that is rigidly fixed to and projects laterally from a metallic cam plate 21, here shown as circular in shape. The sleeve 20 extends from the cam plate 21 through the slot 18 in the head 2 and is freely positioned in the head so that it slides in the slot 18 to disengage the gears or to bring the gears into meshing relation. The cam plate has an open center to accommodate the driven gear, and other parts, and it is mounted, eccentrically of the spool but in a plane parallel with the plane of the spool, in an annular recess in the inner face of the head 2 of the reel.

The circular cam plate is adapted to be shifted about its central axis, carrying with it the bearing sleeve 20, shaft 15, driving gear 19 and the cranking or operating parts for the shaft, to couple the gears 11—19, and to uncouple these gears; and in addition to these coupling and free-reeling conditions the cam plate is operable to apply a double braking action to the spool when the latter is in free-reeling position, as will be described.

For shifting or oscillating the annular cam plate into any one of three positions, for in-gear, free-reeling, and braking, an eccentric or cam disk 22 is rotatably mounted in a recess of the head 2, and a cam pin 23 rigid with the disk projects into a cam-slot 24 of the cam plate 21. The disk 22 is provided with a pivotal stem 25 that extends through a bearing bushing 26 fixed in the head 2, and the reduced threaded end 27 of the stem projects through the reel head to the exterior thereof.

A lever 28, exterior of the head is provided with a hole and fitted on the projecting end of the threaded stud 27, and a clamp nut 29 rigidly fixes the lever on the stem. A knob or handle 30, for pressure from a thumb, is fixed upon the free end of the lever, to shift the lever to in-gear position in full lines Fig. 1, and by dotted lines the lever is shown in successive free-reeling, and braking position.

For use in braking the rotary movement of the spool, I employ an annular metallic brake drum 31 having an annular attaching flange 32, which is attached, as by screws in the concave interior recess of the spool-head or flange 7, and this annular brake drum, concentrically arranged about the center of the spool follows an annular path adjacent the adjustable camplate 21.

Figure 6:
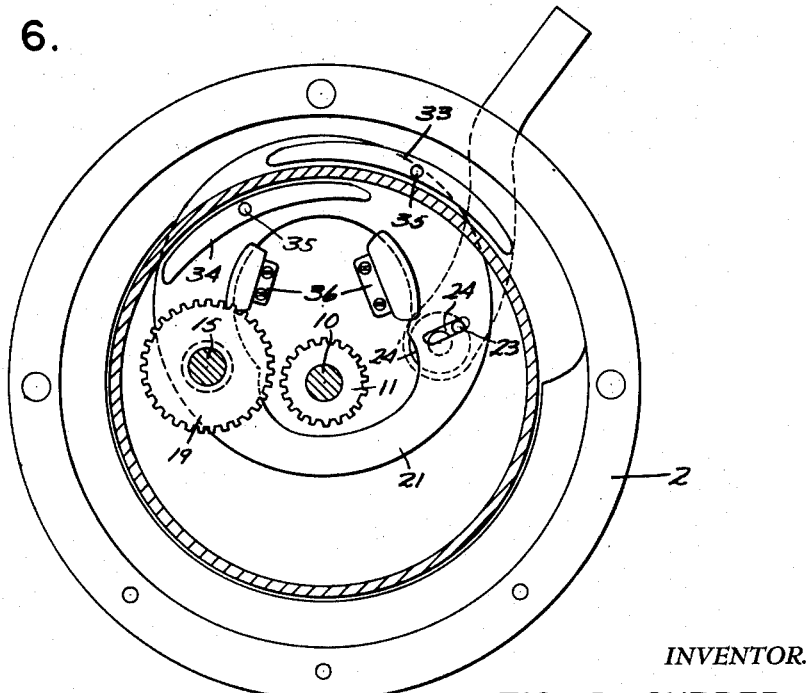
Figure 6 shows the relation of the parts for free-reeling.

The brake shoes 33 and 34, are pivotally mounted by spaced pins 35 on the cam plate for co-action with the brake drum, and these double-acting shoes of crescent shape are fashioned of suitable material for frictional engagement with the outer and inner peripheries of the brake drum respectively. The two pins 35, 35 are fixed on the cam plate at varying distances from its center, whereby the pivotal points 35 of the shoes are located off-center in relation to the brake drum so that the shoes are overbalanced and adapted through rotative movement of the cam plate to frictionally engage the drum when the cam plate is shifted to corresponding positions, such as with the cam plate turned in a clockwise direction the brake shoe 34 will engage the brake drum and with the cam plate turned in a counter-clockwise direction the brake shoe 33 will engage the brake drum. As illustrated in Figure 6 the center of rotation of the cam plate is offset or eccentrically positioned in relation to the center of the brake drum and spool.

The annular cam plate is retained in position within the recessed head of the reel, and guided in its circular movement by any suitable means, as for instance, by a pair of spaced plates 36, 36, that are attached by screws to the head and have overlapping edges for frictional engagement with the cam plate about its open center, and these guides apply ample friction to the cam plate to retain it in adjusted position.

By swinging the lever 28 from in-gear full line position in Fig. 1, to the successive free-reeling, and braking positions indicated by dotted lines, the plate is turned within its guide and retaining plates, for the performance of its various functions.

The clicker or clicking device for audibly signaling a warning that the line is unreeling, is mounted on shaft 10 at the exterior of the head 1 of the reel, in position for convenience of assembly of parts, and where it is readily accessible for removal if necessary for repairs or replacement.

The click includes a ratchet wheel 37 that is rotatable with and slidable on the hexagonal or angular end 38 of the spool shaft 10, which shaft projects through, and beyond the outer face of the circular head 1 of the reel, and a spring blade 39 or noise maker, has its base fixed or embedded in the molded plastic material of a housing 40 so that the free end of the blade co-acts with the rotating ratchet wheel for signalling purposes.

The housing 40 is attached as by screws to the exterior face of the header 1, and it encloses the ratchet 37, which is pressed outwardly by a coiled spring 41 interposed between the rotary ratchet wheel and a recessed part of the head 1.

The angular end 38 of the spool shaft telescopes within a sleeve 42 journaled in the outer end wall of the housing and this sleeve is provided with an exterior hand-knob 43 by means of which the clicking device may be controlled.

Within the interior of the housing 40 a semi-circular cam face 44, arranged concentrically of the shaft-end 38, is fashioned on the housing wall to face the ratchet 37, and an angular cam arm 45 rigid with the sleeve 42 co-acts with this cam face as indicated in the detail view Fig. 2. At one side the ratchet wheel 37 is held in clicking position for the blade 39, by spring 41, and at its opposite side the cam arm 45 of sleeve 42 co-acts with the cam face 44 to retain the ratchet against longitudinal displacement from clicking position.

To release the ratchet from clicking position the knob 43 is turned slightly, thereby turning the cam arm 45 which rides down on the stationary cam face 44, thus moving the sleeve and knob under action of the spring, outwardly; the spring pushes the ratchet causing it to slide on the angular end 38 of the shaft 10 out of engagement with the spring blade of the clicker. By a reverse turn of the knob, the clicker is again restored to operative position. In this combination and arrangement of parts, which permits a complete rotary movement of the knob, as well as only a slight turning movement of the knob, the operator can readily and quickly correct any mistake in his manipulation of the knob, and secure the desired result.

Having thus fully described my invention, what I claim as new and desire to secure by Letters Patent is:

1. In a fishing reel, the combination with a rotatable spool, its shaft, a driven gear rigid with the shaft, and an annular interior brake drum rigid with the spool, of an adjustable partially rotatable plate supported for movement within the reel, a pair of brake shoes pivotally mounted on the plate for co-action with the inner and outer peripheries of the brake drum respectively, said plate having a laterally extending bearing sleeve and an operating shaft journaled in the sleeve, a driving gear on the operating shaft engaging the driven gear, means for rotating the operating shaft, and means for shifting the rotatable plate to disengage said gears and apply said brake shoes to the brake drum.

2. In a fishing reel, the combination with a rotatable spool having a brake drum carried by and extended from one end thereof, a spool shaft extended through the spool, and a driven gear on the spool shaft, of an operating crank arm, a stub shaft on which the operating crank arm is mounted, a driving gear on said stub shaft, a cam plate eccentrically positioned in relation to the spool shaft and brake drum and having a sleeve extended therefrom in which the stub shaft is journaled, a pair of brake drum shoes pivotally mounted on the cam plate and positioned on opposite sides of the peripheral wall of the brake drum whereby upon rotation of the cam plate in one direction one of the brake shoes contacts the brake drum and upon rotation of the cam plate in the opposite direction the other of said shoes contacts the brake drum, and means for actuating the cam plate to engage and disengage the brake shoes from the brake drum and to separate the driving and driven gears or to bring the driving or driven gears into meshing relation.

3. A fishing reel as described in claim 2 wherein the spool is positioned between cylindrical heads with the shaft thereof journaled in the heads and with the said cam plate slidably mounted in a recess in one of said heads.

4. A fishing reel as described in claim 2 wherein the spool is positioned between cylindrical heads with the shaft thereof journaled in the heads and with the said cam plate slidably mounted in a recess in one of said heads, the said heads in which the recess for mounting the cam plate is positioned having means extended through a slot therein for actuating the cam plate from the exterior of the head.

OTIS B. SURBER.

REFERENCES CITED

The following references are of record in the file of this patent:

UNITED STATES PATENTS

| Number | Name | Date |
|---|---|---|
| 220,613 | Havens | Oct. 14, 1879 |
| 659,477 | Holzmann | Oct. 9, 1900 |
| 1,547,297 | Case | July 28, 1925 |
| 1,639,629 | Case | Aug. 16, 1927 |
| 1,697,851 | Case | Jan. 8, 1929 |
| 1,897,499 | Shaw | Feb. 14, 1933 |
| 1,904,992 | Godshalk et al. | May 7, 1935 |
| 2,179,972 | Adams | Nov. 14, 1939 |
| 2,262,462 | Margis, Jr. | Nov. 11, 1941 |
| 2,570,884 | Surber | Oct. 9, 1951 |